United States Patent [19]

Tsukahara et al.

[11] Patent Number: 5,448,537
[45] Date of Patent: Sep. 5, 1995

[54] MAGNET-OPTICAL DISC DRIVE DEVICE WITH SURE DISC PLACEMENT

[75] Inventors: Nobuhiko Tsukahara; Takeshi Mizutani; Hidekazu Seto; Yasuaki Kano, all of Kanagawa; Katsumi Maekawa, Tokyo, all of Japan

[73] Assignee: Sony Corporation, Japan

[21] Appl. No.: 168,880

[22] Filed: Dec. 16, 1993

[30] Foreign Application Priority Data

Dec. 18, 1992 [JP] Japan .................. 4-337737

[51] Int. Cl.6 .................................. G11B 11/00
[52] U.S. Cl. ............................. 369/13; 360/114
[58] Field of Search .............. 369/13, 44.14, 44.11,
369/44.22, 215, 244, 219, 220, 221, 14, 249,
44.16, 44.18, 126, 77.02, 77.01, 75.02; 360/59,
114, 66; 365/122

[56] References Cited

U.S. PATENT DOCUMENTS

| | | | |
|---|---|---|---|
| 5,122,998 | 6/1992 | Mizuno et al. | 369/13 |
| 5,179,544 | 1/1993 | Hezemans et al. | 369/13 |
| 5,193,080 | 3/1993 | Mohri et al. | 369/244 |
| 5,224,079 | 6/1993 | Inoue | 369/13 |
| 5,226,024 | 7/1993 | Mukawa | 369/13 |

*Primary Examiner*—Gerogia Y. Epps
*Assistant Examiner*—Ali Neyzari
*Attorney, Agent, or Firm*—Alan S. Hodes; Limbach & Limbach

[57] ABSTRACT

A magnet-optical disk drive device comprises a disc driving mechanism which includes a drive shaft powered by an electric motor. A magnet-optical disc is detachably connected to the drive shaft. A magnetic field modulation head is positioned at one side of the disc, and an optical unit is positioned at the other side of the disc. A moving mechanism is employed for moving both the magnetic field modulation head and the optical unit in a radial direction of the disc. The magnetic field modulation head is of a floating type wherein a head proper is forced to float above the surface of the disc due to the force of an air flow which is produced when the disc is rotated.

7 Claims, 16 Drawing Sheets

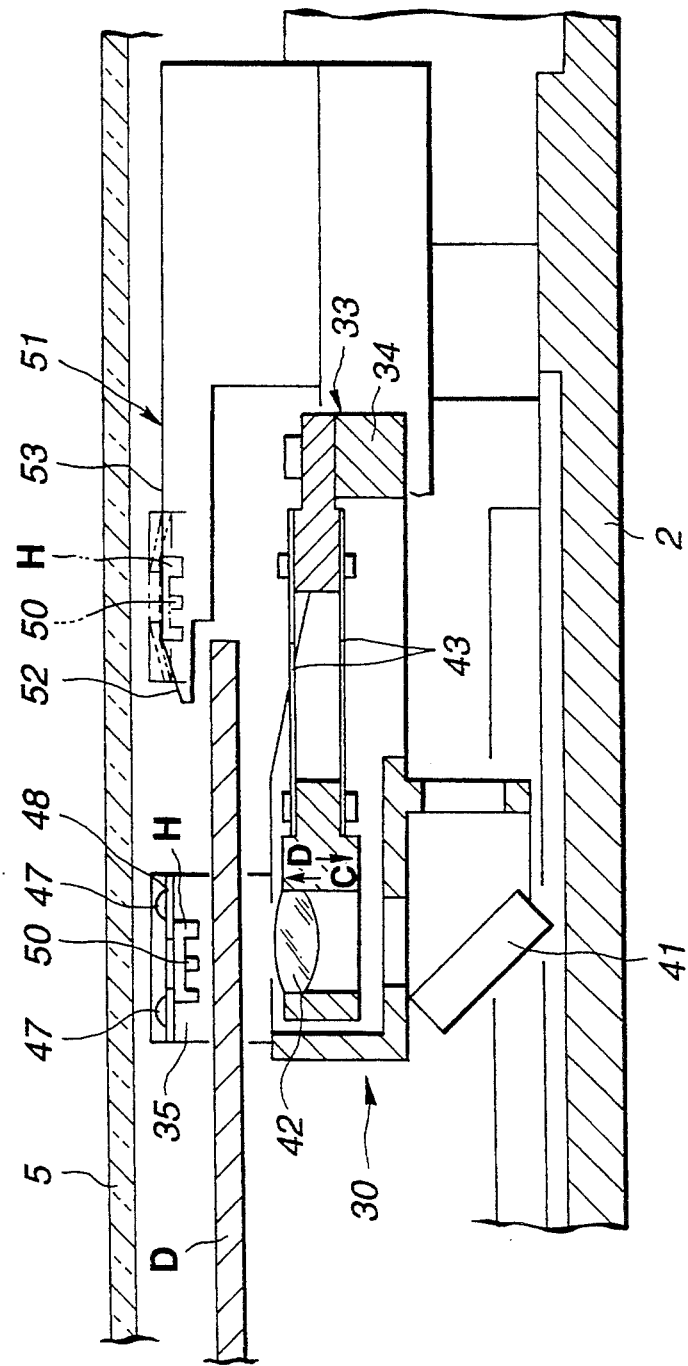

5,448,537

MAGNET-OPTICAL DISC DRIVE DEVICE WITH SURE DISC PLACEMENT

BACKGROUND OF THE INVENTION

1. Field of the Invention

The present invention relates in general to drive devices for driving memory discs or the like, and more particularly to drive devices for driving magneto-optical discs.

2. Description of the Prior Art

Conventional magneto-optical disc drive drives comprise generally a motor-driven disc rotor to which a magneto-optical disc is detachably connected. The drive devices further comprise an optical pick-up mechanism having a moving part which is, when the disc is set in the device, located at one side of the disc. The moving part moves in a radial direction of the disc. At the other side of the disc set in the drive device, there is arranged a magnetic field modulation head which can produce a modulated magnetic field. When, the disc is rotated and the magnetic field modulation head is energized, a laser beam is applied to the disc from the moving part of the optical pick-up mechanism, data is recorded onto the disc or data is read from the disc. The data reading is achieved by detecting the laser beam reflected by the disc.

However, due to their inherent construction, the above-mentioned conventional drive devices have the following drawbacks.

First, they are bulky in construction. That is, in such conventional devices, a space must be provided for the disc loading mechanism and another space must be provided for loading the disc.

Second, the magnetic field modulation head used must have a marked power. That is, for dust protection, the disc is housed in a disc case. However, this necessitates an increased distance between the disc and the magnetic field modulation head.

Third, due to the nature of the drive devices of the type wherein a disc is detachably connected to the disc rotor, it is difficult to properly set the disc to be concentric relative to the rotation center of the disc rotor. As is known, eccentricity of the disc relative to the disc rotor causes frequent movement of the moving part of the optical pick-up mechanism, so that moving elements of the moving part tend to shorten their lives.

SUMMARY OF THE INVENTION

It is therefore an object of the present invention to provide a magneto-optical disc drive device which is free of the above-mentioned drawbacks.

According to the present invention, there is provided a magneto-optical disc drive device which comprises a disc driving mechanism including a drive shaft powered by an electric motor; connecting means for detachably connecting a magneto-optical disc to the drive shaft; a magnetic field modulation head positioned at one side of the disc; an optical unit positioned at the other side of the disc; a moving mechanism for moving both the magnetic field modulation head and the optical unit in a radial direction of the disc; and floating means for floating the head in air by using the force of an air flow which is produced when the disc is rotated.

BRIEF DESCRIPTION OF THE DRAWINGS

Other objects and advantages of the present invention will become apparent from the following description when taken in conjunction with the accompanying drawings, in which:

FIG. 10 is a sectional view of a moving part of an optical pick-up mechanism;

DETAILED DESCRIPTION OF THE INVENTION

Figure 1:
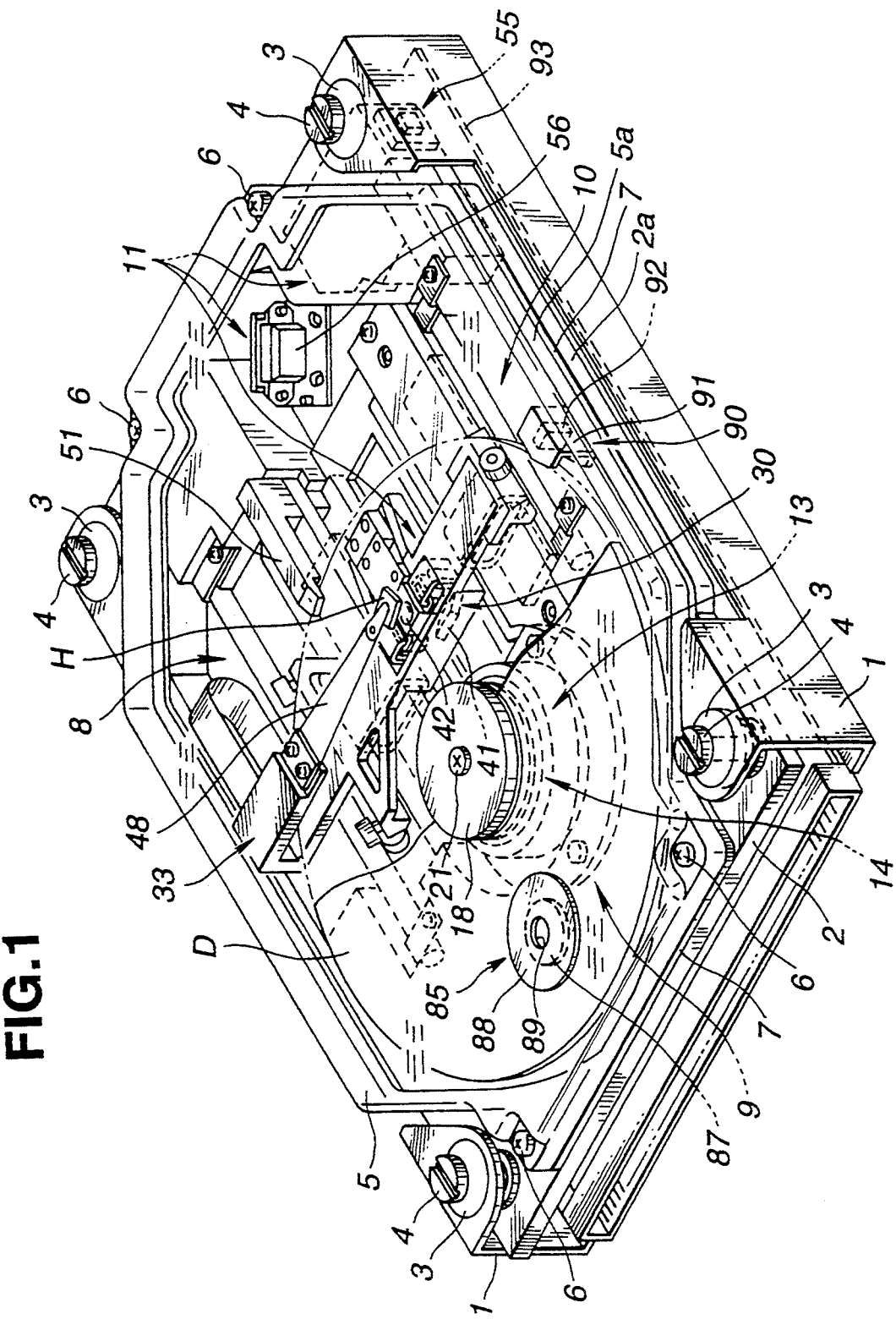
FIG. 1 is a perspective view of the magneto-optical disc drive device of the present invention.

In the followings, the magneto-optical disc drive device of the invention will be described with reference to the accompanying drawings.

[Entire construction]

Referring to FIGS. 1 to 5, there is shown the drive device of the invention, which is constructed to play or play-back a 3.5 inch type magneto-optical disc which is designated by reference D. As will be understood from FIG. 1, the drive device is shaped into a generally flat rectangular parallelepiped.

The device comprises a generally rectangular chassis 2, each side equipped with a side frame 1. Each side frame 1 is connected at front and rear ends thereof to the chassis 2 through bolts 4 and insulators 3. Due to the insulators 3, the chassis 2 is protected from external vibration.

Above the chassis 2, there is arranged a top cover 5. The chassis 2 is formed therearound with a side wall 2a which projects upward, and the top cover 5 is formed therearound with a side wall 5a which projects downward. Four bolts 6 are used for uniting the chassis 2 and the top cover 5. Between the side wall 2a of the chassis 2 and the side wall 5a of the top cover 5, there is compressed a gasket 7. Thus, a substantially sealed container space 8 is defined by the chassis 2 and the top cover 5.

Within the containing space 8, there are arranged a disc driving mechanism 9 for rotating the magneto-optical disc, a moving mechanism 10 for moving a magnetic field modulation head H and an optical unit 30 in a radial direction of the disc D and an optical pick-up mechanism 11 for picking up a laser beam which has been emitted therefrom toward the disc D and reflected by the disc D. The optical unit 30 constitutes a part of the optical pick-up mechanism 11.

[Disc driving mechanism 9]

Figure 6A:
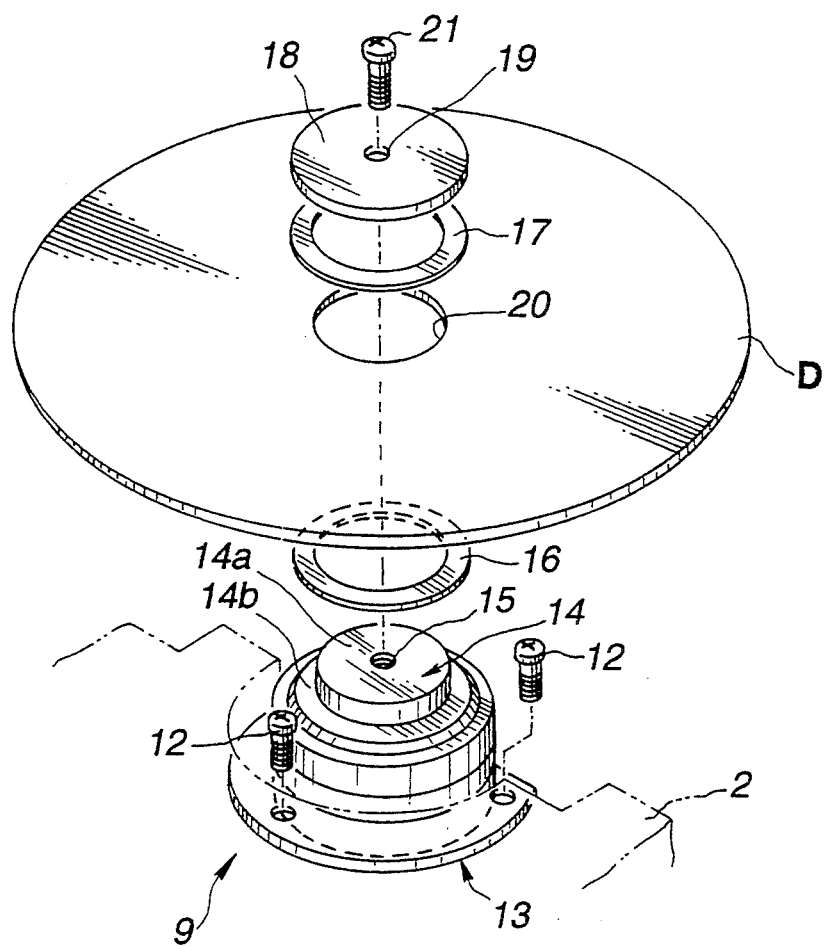
FIG. 6A is a perspective view of a disc driving mechanism.
Figure 6B:
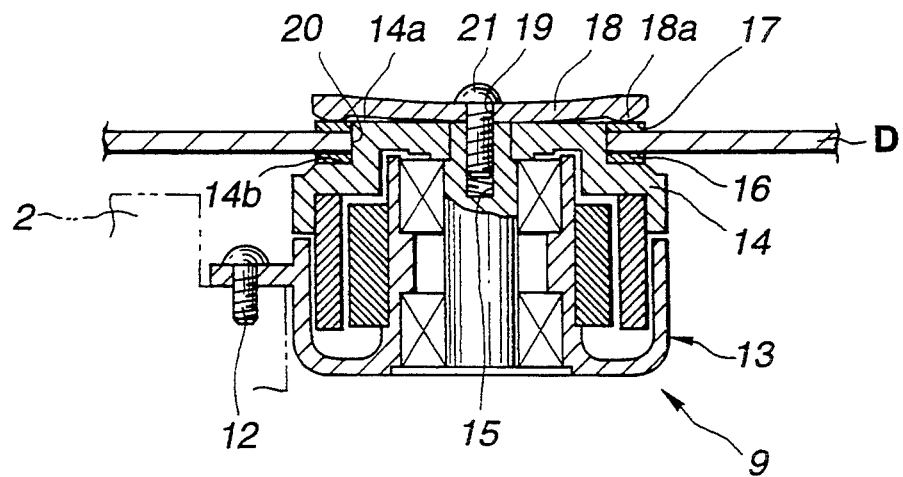
FIG. 6B is a vertically sectional view of the disc driving mechanism.

As is best shown in FIGS. 6A and 6B, the disc driving mechanism 9 comprises a spindle motor 13 which is mounted on the chassis 2 through bolts 12. The motor 13 has a projected drive shaft 14 which is rotated when the motor 13 is energized. An upper circular end 14a of the drive shaft 14 is formed at a center thereof with a threaded bolt opening 15. The circular end 14a is further formed therearound with an annular recess 14b.

The magneto-optical disc D is detachably connected to the drive shaft 14. For this connection, an annular lower spacer 16, an annular upper spacer 17, a circular press plate 18 and a threaded bolt 21 are used, as shown in FIG. 6A. The spacers 16 and 17 are made of metal or rubber materials. The circular press plate 18 is formed with a center opening 19, and as is seen from FIG. 6B, is formed at its peripheral lower surface with an annular ridge 18a. First, the lower spacer 16 is put on the annular recess 14b of the shaft 14, and the disc D is put on the flower spacer 16 having the upper circular end 14a of the shaft 14 received in a center opening 20 of the disc D. Then, the upper spacer 17 and the circular press plate 18 are put on the disc D in order. Then the bolt 21 is inserted into the opening 19 of the press plate 18, the upper spacer 17, the opening 20 of the disc D and the lower spacer 16, and screwed into the bolt opening 15 of the drive shaft 14 driven by the motor 13.

With these steps, the disc D is tightly connected to the drive shaft 14 as is seen from FIG. 6B. That is, with the annular ridge 18a of the circular press plate 18 pressed against the disc D by the bolt 21, the disc D is pressed against the drive shaft 14. The peripheral portion of the opening 20 of the disc D is evenly pressed against the annular recess 14b of the shaft 14, minimizing undesired deflection which would be produced on the disc D. This facilitates the focusing of a laser beam on the disc D. Because the disc D can be connected to the drive shaft 14 by means of a so-called "multi-point connection" provided by the annular ridge 18a of the circular press plate 18, the disc D, which is constructed of fragile material, is protected from being broken upon the connection. The lower and upper annular spacers 16 and 17, which are each flattened, can promote the above-mentioned multi-point connection. Thus, smooth and well balanced rotation of the disc D is achieved.

[magneto-optical disc D]

The disc D is constructed of an optical glass and so sized that the outer diameter is 95 mm, the inner diameter is 15 mm to 25 mm and the thickness is 0.8 mm. Thus, the disc D has substantially the same plan size as a conventional magnetic hard disc, but the disc D is somewhat thinner than the conventional hard disc. Since the disc D is somewhat larger in diameter than a conventional cartridge type 3.5 inch magneto-optical disc, it has a larger memory capacity. Furthermore, since the disc D is constructed of an optical glass, not a plastic, undesired deflection of the disc D under rotation thereof is suppressed or at least minimized. Thus, the rotation speed of the disc D can be increased correspondingly.

Figure 7:
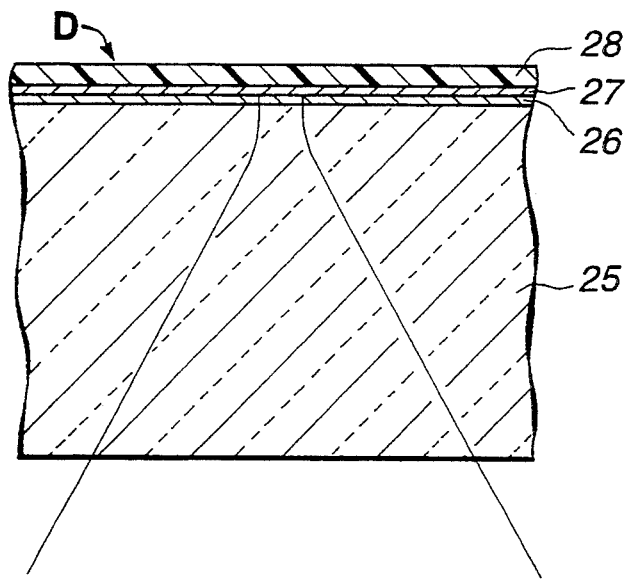
FIG. 7 is an enlarged sectional view of a magneto-optical disc.

FIG. 7 shows a sectional view of the magneto-optical disc D. As is seen from this drawing, the disc D comprises a glass base 25, a molybdenum (Mo) film 26 lined on an upper surface of the glass base 25, an aluminum reflecting film 27 lined on the molybdenum film 26 and a UV plastic film 28 lined on the reflecting film 27. The exposed surface of the UV plastic film 28 is polished to have a surface roughness of about 0.2 micrometer. Thus, as is discussed in detail below, a flying type magnetic field modulation head H can be used.

Figure 8:
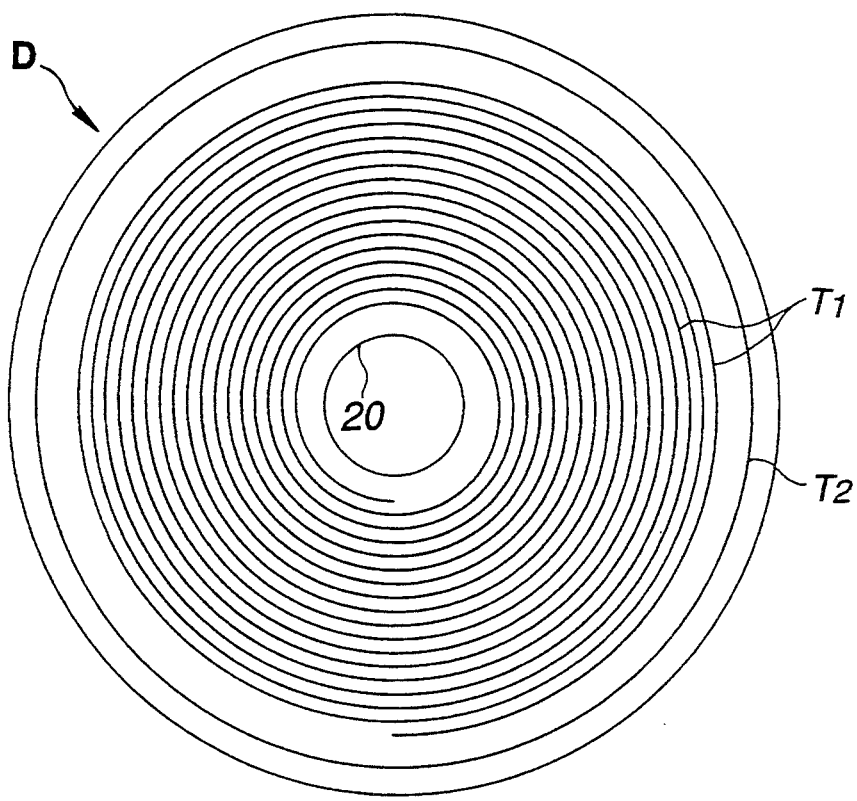
FIG. 8 is a view of a track pattern of the magneto-optical disc.

As is understood from FIG. 8, the magneto-optical disc D is thereafter formed with a spiral data track T1. Designated by reference T2 is a centering track which has been conventionally located on a peripheral portion of the disc D. The centering track T2 is concentric with the center opening 20. When connecting the disc D to the drive shaft 14, exact centering of the disc D relative to the rotation center of the drive shaft 14 is made by using a microscope or the like through which the centering track T2 is detected. Thus, the amount of eccentricity of the disc D relative to the drive shaft 14 is minimized. Thus, not only is the movement of movable parts required for achieving tracking reduced and thus the lives of the parts prolonged, but also the accuracy and reliability of the tracking increase correspondingly. The track-to-track distance can be reduced and thus the memory capacity of the disc D can be increased correspondingly. All kinds of photo-electromagnetic discs can be properly connected to the drive shaft 14 so long as they have centering tracks T2. This means that a recorded disc D can be also applied to the drive shaft 14. Of course, in place of the centering track T2, other types of centering track may be used, which are, for example, a track having evenly spaced blanks, a track extending around the center opening 20 and the like.

[Moving mechanism 10]

Figure 9:
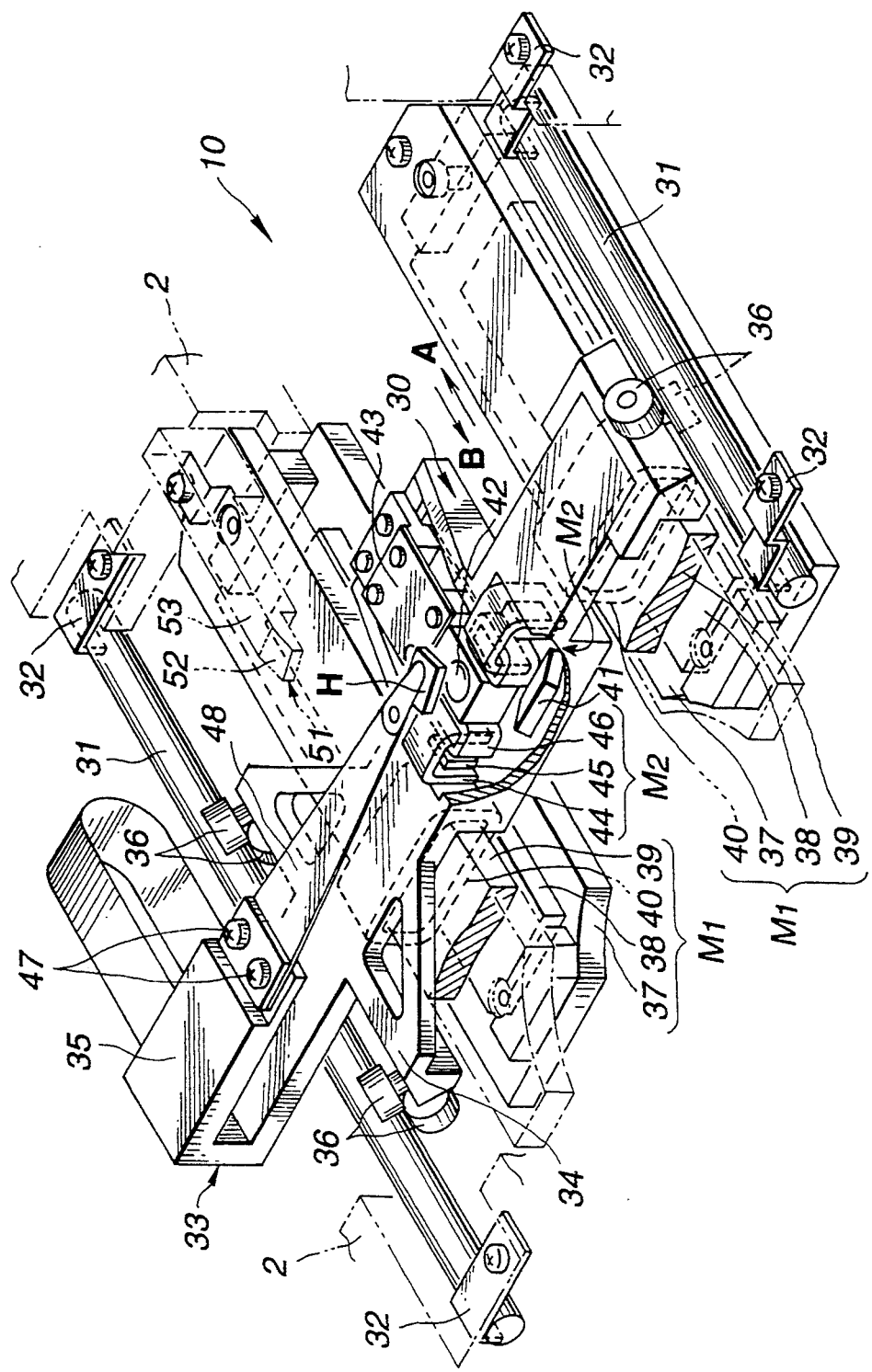
FIG. 9 is a perspective view of a disc moving mechanism.

The moving mechanism 10 is clearly shown in FIG. 9. The moving mechanism 10 moves the magnetic field modulation head H and the optical unit 30 in the radial direction of the disc D. The moving mechanism 10 comprises two parallel guide rails 31 which are secured to the chassis 2 through connecting brackets 32. As will be understood from FIGS. 1 and 9, the guide rails 31 (not shown in FIG. 1) are cylindrical and extend in the direction in which the disc D is conveyed or moved.

Referring back to FIG. 9, a slider 33 which slides along the guide rails 31 has a generally U-shaped construction including a lower flat part 34, an upper flat part 35 and a strut part (no numeral) through which the lower and upper flat parts 34 and 35 are united. Although not shown in this drawing, the disc D is horizontally arranged between the lower and upper flat parts 34 and 35. The lower horizontal part 34 has three portions each having a pair of rollers 36 which roll on one of the guide rails 31. As shown, each pair of the rollers 36 are inclined about 90 degrees relative to each other. Thus, the slider 33 can smoothly slide on and along the guide rails 31 keeping the disc D at the same position. That is, the slider 33 can move in the radial direction of the disc D.

The slider 33 is driven by a drive force produced by a pair of voice coil motors M1. These motors M1 are arranged with the optical unit 30 therebetween.

Each voice coil motor M1 comprises an outside yoke 37, a magnet 38 and an inside yoke 39 which are secured to the chassis 2 and a coil 40 which is secured to the lower flat part 34 of the slider 33. The outside yokes 37, the magnets 38 and the inside yokes 39 of the two motors M1 extend in the same direction as the guide rails 31 extend. The magnet 38 is mounted on the outside yoke 37, and the inside yoke 39 is mounted on the magnet 38 with a certain space defined therebetween. As shown in FIG. 9, the coil 40 of each motor M1 is arranged to spacedly enclose the corresponding inside yoke 39. Thus, the slider 33 slides in the direction of the arrow A or B depending on the direction of the current which flows in the coils 40.

The lower flat part 34 of the slider 33 carries the optical unit 30 and the upper flat part 35 carries the magnetic field modulation head H.

[Optical unit 30]

As is seen from FIGS. 9 and 10, the optical unit 30 comprises a beam reflecting mirror 41 secured to a lower portion of the lower flat part 34. The mirror 41 is inclined by about 45 degrees relative to the lower flat part 34. The mirror reflects a laser beam from a Galvano-mirror toward an objective lens 42 and vice versa. As is seen from FIG. 10, each of a pair of spring plates 43 are connected at one end to the lower flat part 34. The spring plates 43 hold at their leading ends the objective lens 42. The objective lens 42 is positioned just above the beam reflecting mirror 41. Due to the nature of the spring plates 43, the objective lens 42 can move upward and downward.

The objective lens 42 is moved by a drive force produced by a pair of voice coil motors M2. These motors M2 are arranged to put therebetween the objective lens 42.

As is seen from FIG. 9, each voice coil motor M2 comprises a yoke 44 and a magnet 45 which are secured to the lower flat part 34 and a coil 46 which is secured to the objective lens 42. Thus, as is seen from FIG. 10, the lens 42 moves in the direction of the arrow C or D depending on the direction of the current which flows in the coils 46.

The objective lens 42 has the numerical aperture (NA) which is equal to or greater than 0.55.

Figure 11A:
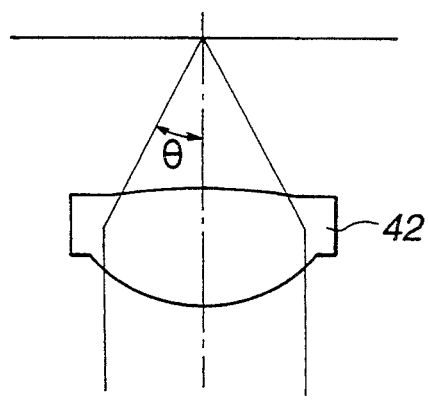
FIG. 11A is an illustration for explaining the numerical aperture of a lens.

As is understood from FIG. 11A, the numerical aperture is represented by:

$$NA = n \times Sine\theta \quad (1)$$

wherein:
n: index of refraction of laser beam in air

Figures 11B, 11C, 11D:
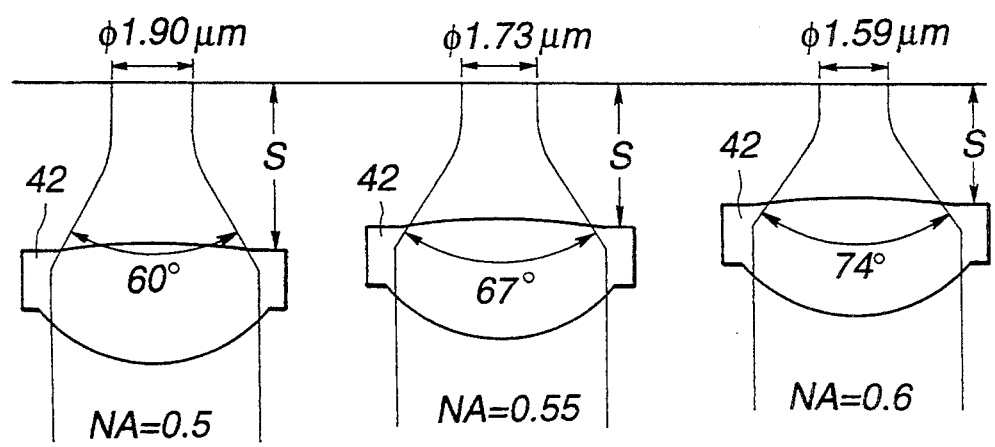
FIGS. 11B to 11D are illustrations for showing the relationship between the numerical aperture, a spot aperture, etc.

As is understood from FIGS. 11B, 11C and 11D, with increase of the numerical aperture (NA) the distance "S" between the lens 42 and the disc D and the spot diameter "φ" of the laser beam from the lens 42 can be reduced. Thus, track density of the disc D can be increased. In general, the focus control of laser beam becomes difficult with increase of numerical aperture (NA). However, in the device of the present invention, the magneto-optical disc D is used without a case. Thus, the objective lens 42 can be positioned very near the disc D, which allows for an increase in track density of the disc D.

[Magnetic field modulation head H]

Figure 12:
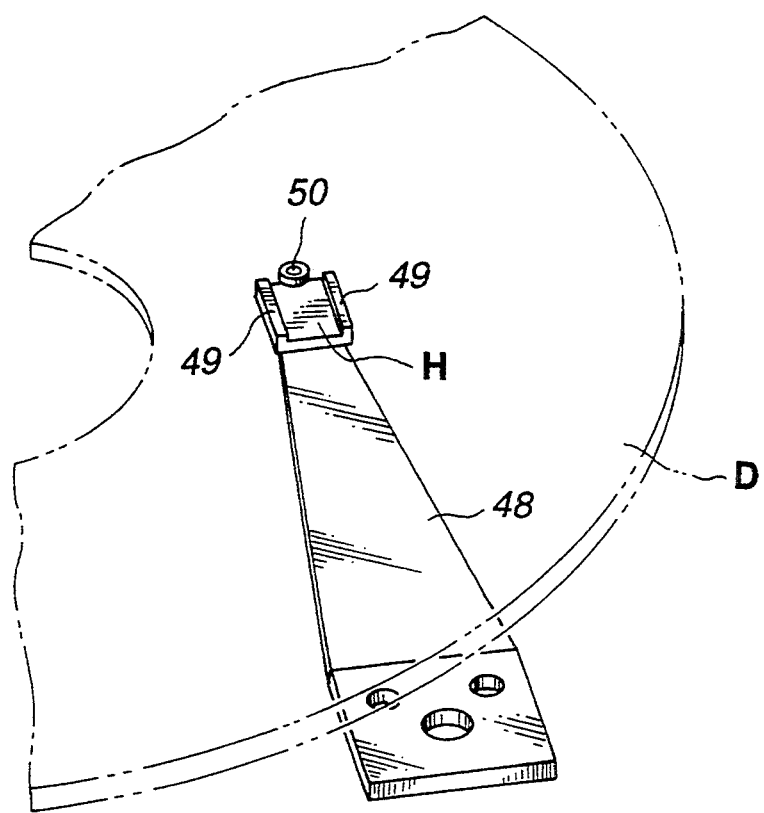
FIG. 12 is a perspective view of a magnetic field modulation head taken from the bottom of the disc drive device.

As is seen from FIG. 9, the magnetic field modulation head H is held by one end of a spring plate 48 which is connected at the other end to the upper flat part 35 of the slider 33 through bolts 47. The spring plate 48 extends in a direction perpendicular to the direction in which the slider 33 moves. As is seen from FIG. 12, the head H is formed at its lower surface with two spaced ridges 49. A head element 50 is arranged between the two ridges 49. As is seen from FIG. 10, the head element 50 is positioned above the objective lens 42 and so constructed as to selectively produce a bi-directional magnetic field which runs perpendicular to the surface of the disc D. The head H is thus of a flying type which, when the disc D is rotated at a high speed, the spring plate 48 is flexed away from the disc D due to an air flow produced by the rotating disc D. Thus, the head D can be positioned very near the upper surface of the disc D. In fact, the flying height of the head H can be smaller than 10 microns. This means that the magnetic field modulation is achieved with relatively low power. Because the spring plate 48 extends in the direction perpendicular to the direction in which the slider 33 moves, the movement of the slider 33 does not require a large space. If the spring plate 48 is arranged to extend in the direction in which the slider 33 moves, the movement requires a larger space and thus the entire construction of the device becomes larger.

[Head resting structure 51]

As is seen from FIGS. 9 and 10, a head resting structure 51 has an elongate shape which extends in the direction in which the slider 33 moves. The structure 51 has a base end secured to the chassis 2. As is seen from FIG. 10, the leading or free end of the structure 51 is positioned above the peripheral portion of the disc D. The leading end is formed with a tapered upper surface portion 52 which tapers toward the end. The upper surface portions other than the tapered portion 52 are flat, which is designated by numeral 53.

When, as will be understood from FIGS. 9 and 10, the slider 33 is moved toward the head resting structure 51, the spring plate 48 of the head H rides on the tapered upper surface 52 of the structure 51 against a biasing force produced thereby and finally rides on the flat major surface 53 of the same to assume a rest position which is shown by broken lines in FIG. 10. Under this rest condition, the spring plate 48, and thus the head H, are held stationary by the head resting structure 51. That is, the slider 33 assumes its rest position.

In place of the above-mentioned head resting structure 51, other types of resting structures may be used, one of which is a type which grips the spring plate 48 with lower and upper fingers. Furthermore, if desired, the head resting structure 51 may be positioned at an inboard side with respect to the disc D.

[optical pick-up mechanism 11]

Figure 13:
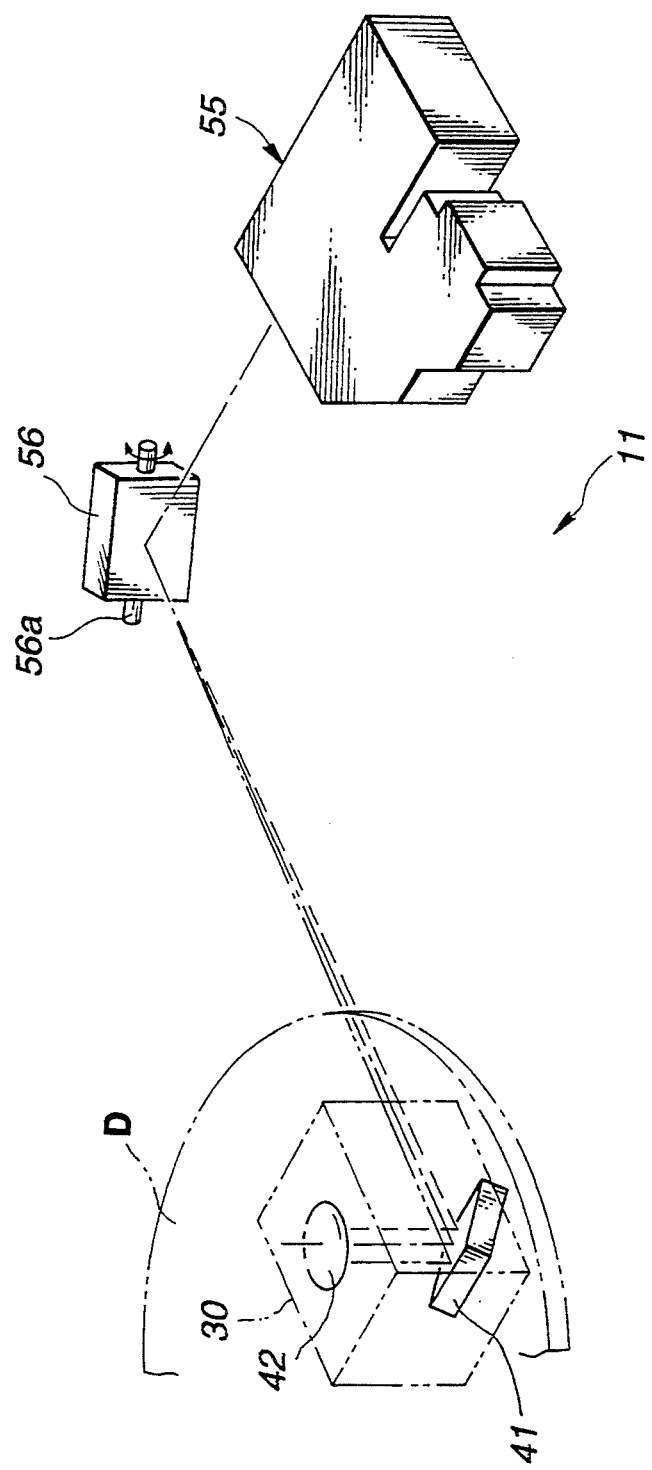
FIG. 13 is an illustration schematically showing the construction of the pick-up mechanism.

As is seen from FIG. 13, the optical pick-up mechanism 11 has an optical path system which comprises a fixed optical device 55 secured to the chassis 2, a Galvano-mirror 56 pivotally mounted on the chassis 2 and the above-mentioned optical unit 30 mounted on the slider 33.

Figure 14:
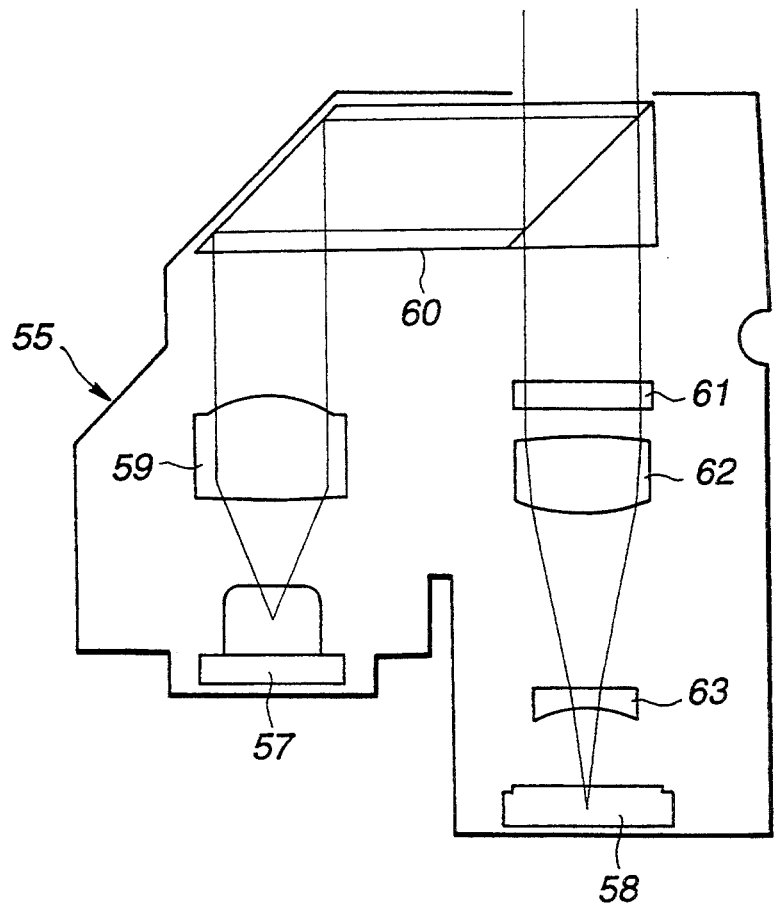
FIG. 14 is an illustration schematically showing an optical system.

As is seen from FIG. 14, the fixed optical device 55 comprises a laser diode 57 and a photo detector 58. Laser beams (wave length: 780 or 680 nanometer) emitted from the laser diode 57 are converged by a collimator lens 59 to constitute parallel laser beams. The parallel laser beams then enter a beam splitter 60 to be directed toward the Galvano-mirror 56. While, laser beams returned back through the Galvano-mirror 56 pass through a part of the beam splitter 60, a ½ lambda plate 61, a collimator lens 62 and a concave lens 63 to be focused on the photo detector 58.

Referring back to FIG. 13, the Galvano-mirror 56 has a horizontal pivot shaft 56a for pivotal movement about the axis of the shaft 56a. Due to the pivotal movement of the Galvano-mirror 56, the direction in which the laser beams from the mirror 56 advance changes in the direction of the radius of the magneto-optical disc D. For the pivotal movement of the Galvano-mirror 56, an electric motor M3 (see FIG. 15) is used.

[Control circuit]

Figure 15:
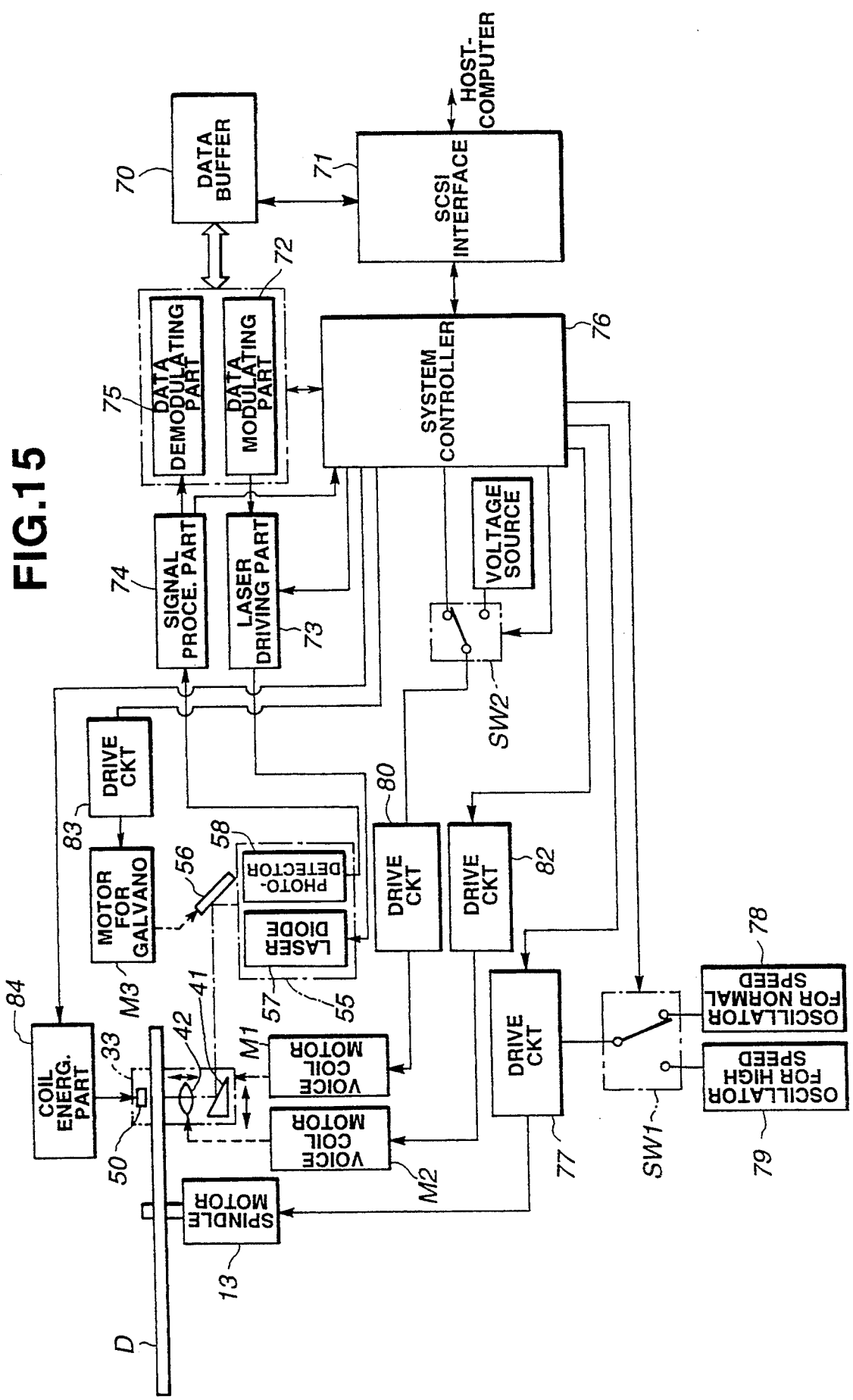
FIG. 15 is a block diagram of a control circuit of the drive device of the invention.

A block diagram of the magneto-optical disc drive device is shown in FIG. 15. In the drawing, denoted by numeral 70 is a data buffer which exchanges data with a host-computer through a SCSI interface 71. The data of the data buffer 70 are outputted to a data modulating part 72. On the basis of a given write clock, the data modulating part 72 modulates the data and outputs the modulated data to a laser driving part 73. Responsive to a drive signal from the laser driving part 73, the laser diode 57 emits laser beams onto the disc D. The laser beams are reflected from the disc D and are detected by the photo detector 58 which outputs a signal representative of information possessed by the reflected laser beams. The signal is treated by a signal processing part 74. In the signal processing part 74, on the basis of a given read clock, address data and user data are regenerated and the position detecting signal is also regenerated. The regenerated address data and user data are outputted to a data demodulating part 75 and demodulated. The address data and the position detecting signal are fed to a system controller 76.

The system controller 76 controls various drive circuits 77, 80, 82 and 83 and first and second switches SW1 and SW2 in accordance with command signals fed thereto through the SCSI interface 71. Furthermore, the system controller 76 controls a coil energizing part 84 of the head element 50. The system controller 76 carries out programmed operation steps shown in flowcharts of FIGS. 16 to 18, which will be described hereinafter. The first switch SW1 changes the clock frequency applied to the drive circuit 77 of the spindle motor 13. That is, based on a switch control signal from the system controller 76, the first switch SW1 selects either the output from one oscillator 78 for normal speed or the output from another oscillator 79 for high speed. The second switch SW2 switches a signal fed to the drive circuit 80 of the voice coil motor M1 for the slider 33. That is, based on a switch control signal from the system controller 76, the second switch SW2 selects either a drive control signal from the system controller 76 or a rest signal from a certain voltage source 81. When the second switch SW2 selects the rest signal, the slider 33 is moved to the rest position. The interface circuit 71, the system controller 76, the various drive circuits 77, 80, 82 and 83, the data modulating parts 72 and 75 and the data buffer 70 are all mounted on a circuit board 93. The circuit board 93 is arranged beneath a lower surface of the chassis 2.

Figure 2:
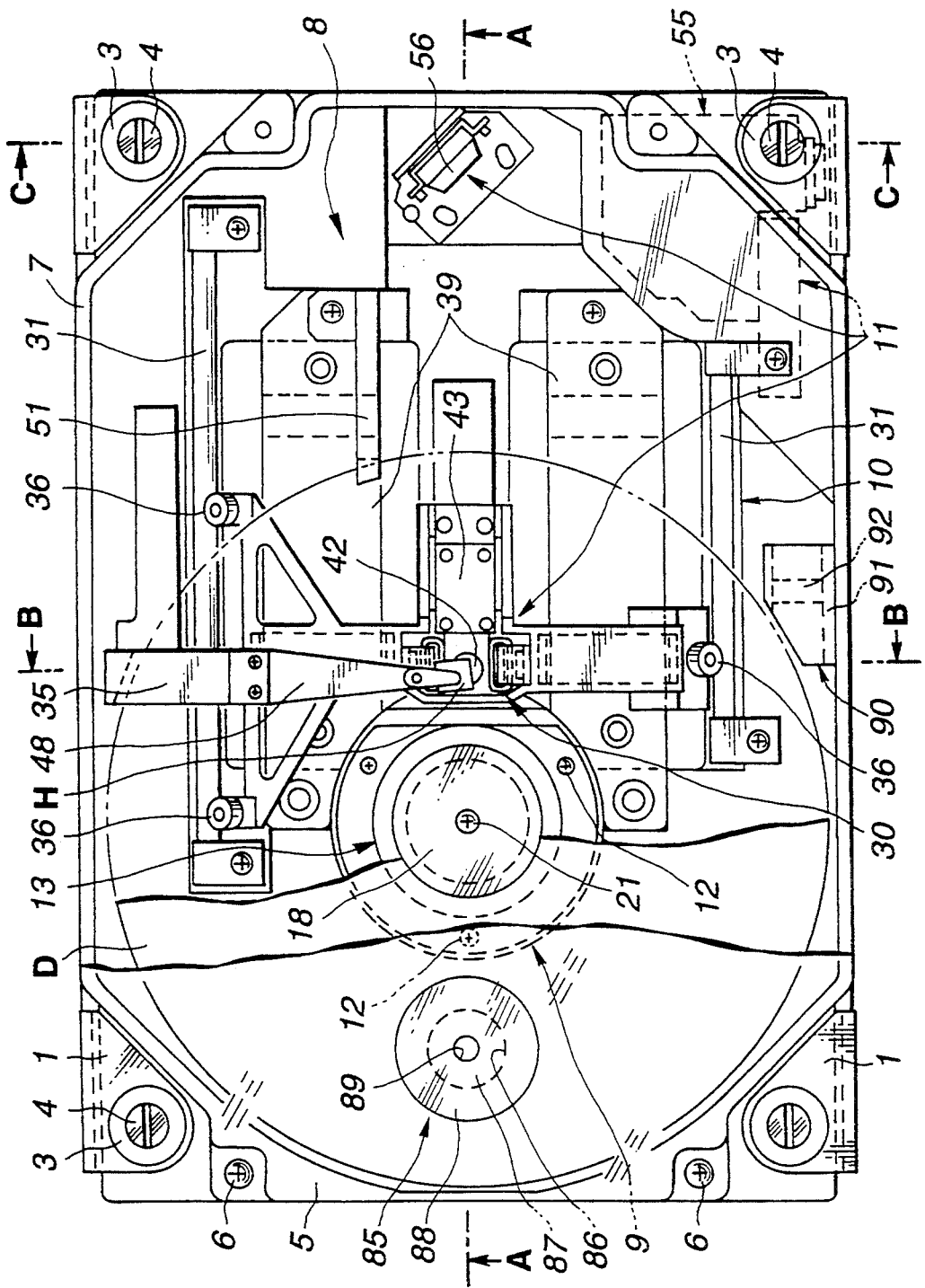
FIG. 2 is a plan view of the drive device of the invention.
Figure 3:
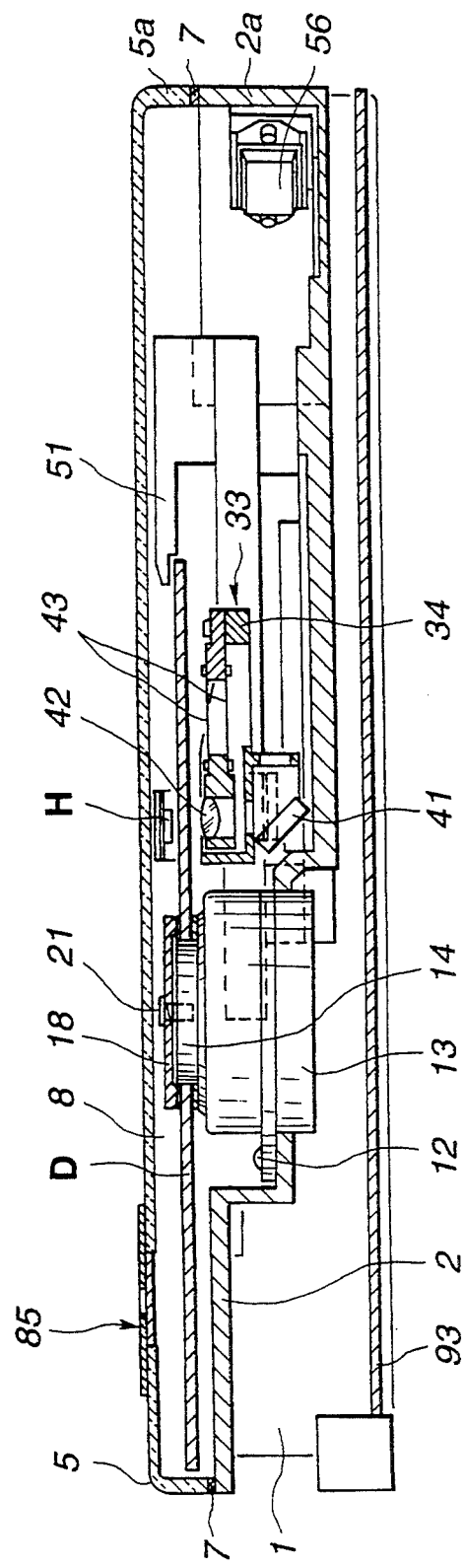
FIG. 3 is a sectional view taken along the line A—A of FIG. 2.
Figure 4:
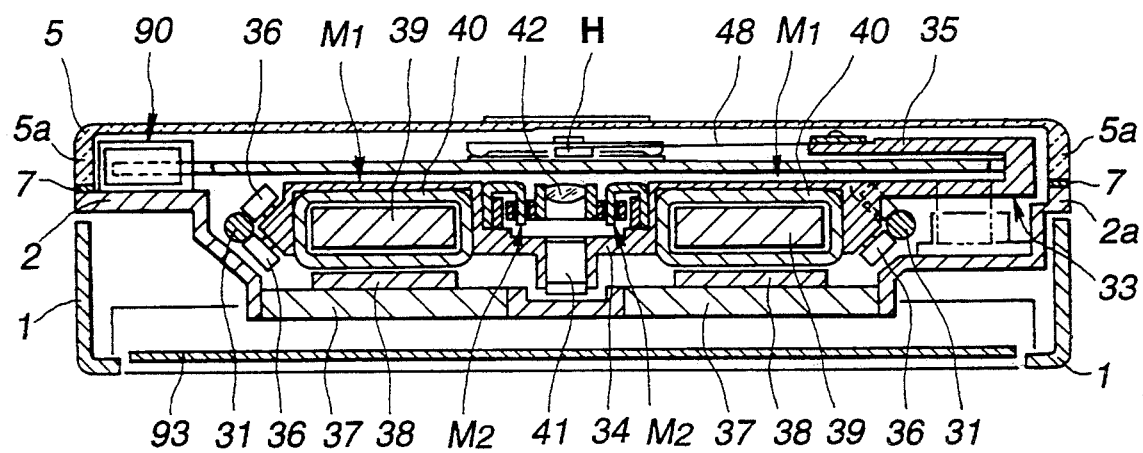
FIG. 4 is a sectional view taken along the line B—B of FIG. 2.
Figure 5:
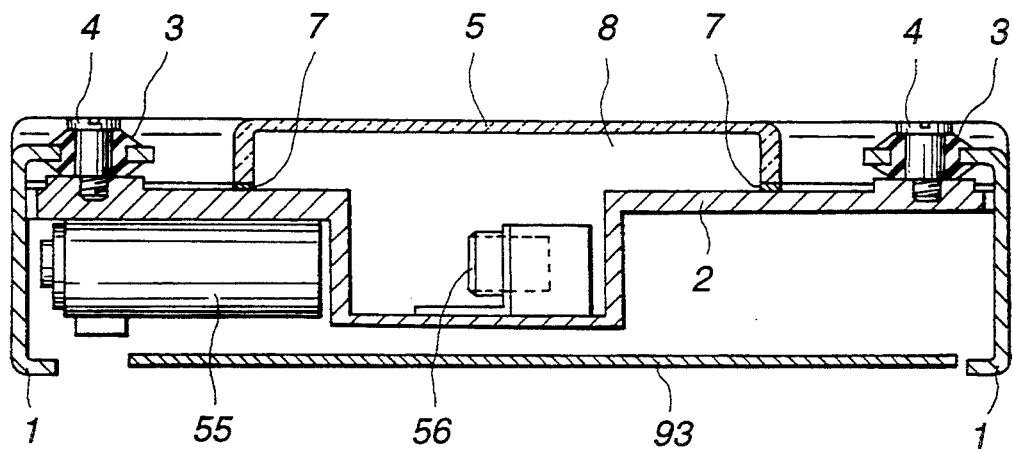
FIG. 5 is a sectional view taken along the line C—C of FIG. 2.

As is seen from FIGS. 1, 2 and 3, the top cover 5 is equipped with a breathing structure 85. The breathing structure 85 comprises a filter element 87 which fills an aperture 86 formed in the top cover 5. A circular adhesive plate 88 connects the filter element 87 to the top cover 5. The plate 88 is formed with a small aperture 89 through which the container space 8 communicates with the outside. Thus, the pressure in the container space 8 equals the outside pressure, and dust or the like in the outside are prevented from entering the space 8 by the filter element 87.

As is seen from FIGS. 1 and 2, within the container space 8, there is installed an air cleaner structure 90 which is located near the periphery of the disc D. The air cleaner structure 90 comprises a duct 91 and a filter element 92 installed in the duct 91. The filter element 92 has a layered structure. When the disc D rotates, air flow is produced in the vicinity of the peripheral portion of the disc D. Thus, during air flow in the duct 91, any dust is the air are trapped by the filter element 92.

The chassis 2, the top cover 5 and parts which define the enclosed space 8 are all coated with a cation paint.

It is to be noted that the thickness (the distance between an upper end of the top cover 5 and a lower end of the chassis 2 to which the circuit board 93 is mounted) of the drive device of the invention is smaller than 1 inch (25.4 mm).

Figure 16:
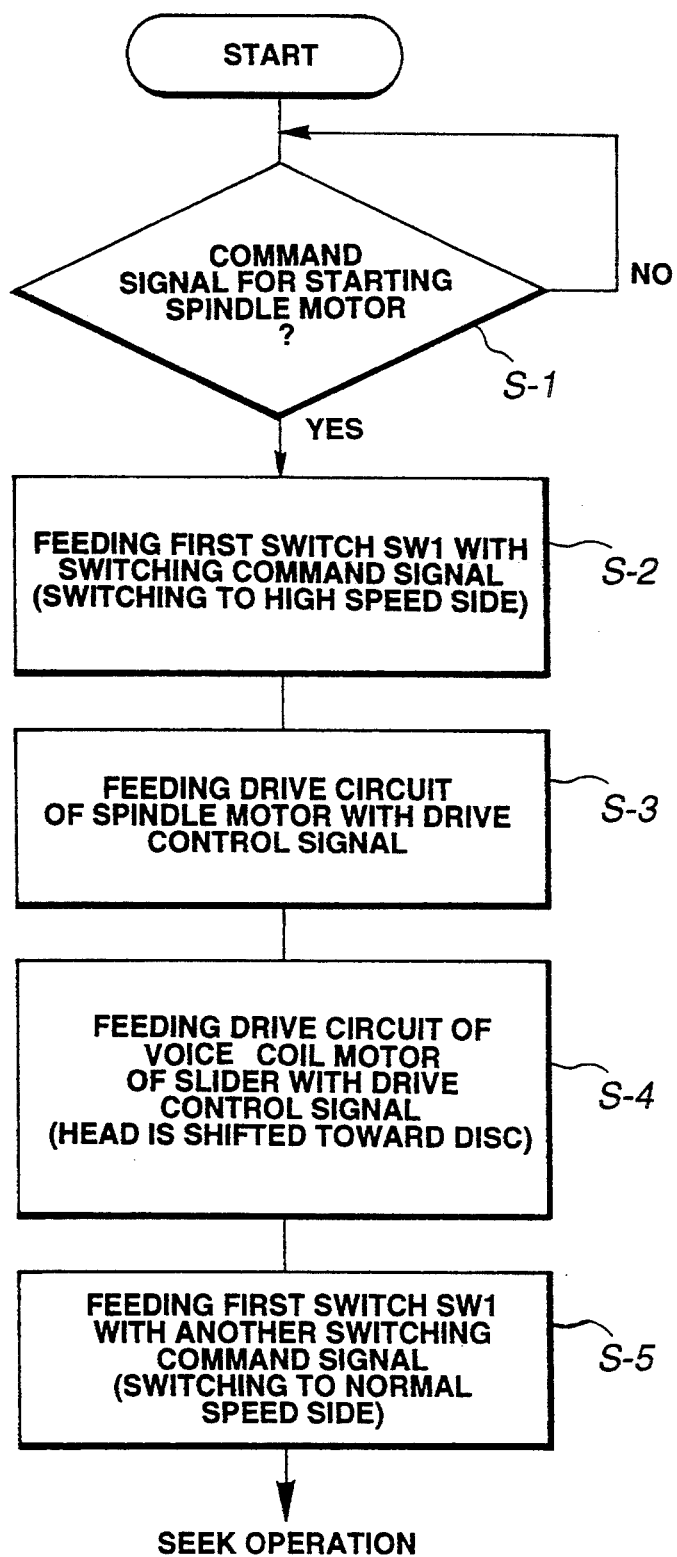
FIG. 16 is a flowchart showing programmed operation steps used for starting a spindle motor.

In the followings, operation of the magneto-optical disc drive device of the invention will be described with reference to the drawings and flowcharts shown in FIGS. 16 to 18.

For ease of understanding, the description begins with the device not operating.

In this non-operating condition, as is seen from FIG. 10, the magnetic field modulation head H assumes the rest position as shown by the broken lines, and the magneto-optical disc D is still.

When now the spindle motor 13 is fed with a start command signal (S-1) (see FIG. 16), the system controller 76 feeds the first switch SW1 with a switching command signal (S-2). With this, the first switch SW1 switches to connect with the oscillator 79 for high speed (see FIG. 15) causing the drive circuit 77 of the spindle motor 13 to be fed with a drive control signal (S-3). Thus the spindle motor 13 starts rotating. Because the drive circuit 77 is operated with a clock from the oscillator 79 for high speed, the spindle motor 13 runs at a higher speed. After the operation of the spindle motor 13, the drive circuit 80 of the voice coil motors M1 on the slider 33 is fed with a drive control signal (S-4) causing the head H to be moved away from the rest position, separating the spring plate 48 from the head resting structure 51, and to be brought to an operative position just above the disc D. Upon separation of the spring plate 48 from the head resting structure 51, the head H is strongly flexed toward the disc D due to the biasing force which has been stored by the spring plate 48. However, the high speed rotation of the disc D prevents the head H from contacting the disc D. That is, under high speed rotation of the disc D, there is produced therearound an air flow which functions to support the head H.

Thereafter, the system controller 76 feeds the first switch SW1 with another switching command signal (S-5), so that the first switch SW1 switches to connect with the oscillator 78 for normal speed. Upon this, the drive circuit 77 is operated with a clock from the oscillator 78 for normal speed, and the spindle motor 13 reduces the speed to a lower, normal, level.

When the system controller 76 is fed with a writing or reading command signal from the host-computer, the optical pick-up mechanism 11 emits a laser beam to the disc D and detects a part of the beam which is reflected from the disc D. Data carried by the reflected laser beam is regenerated by the data demodulating part 75 to detect a current address. After calculating the difference or displacement between the current address and a target address (i.e., target track), the voice coil motor M1 of the slider 33 is energized. Then, a current address is detected again, and the current address is compared to the target address. If they do not match with each other, the energization of the voice coil motor M1 is somewhat changed so as to position the current address on the track of the target address (rough seek movement).

In case of writing, based on data modulated by the data modulating part 72, the laser driving part 73 energizes the laser diode 57, and at the same time the coil energizing part 84 energizes the head element 50. In case of reading, data carried by the reflected laser beam detected by the photo detector 58 is converted by the signal processing part 74 to a binary sign4land the binary signal is modulated by the data modulating part 75.

In the above-mentioned writing/reading process, a tracking servo is such that, based on the output from the photo detector 58, the regenerative signal processing part 74 detects the amount of off-tracks, and the system controller 76 controls the drive circuit 83 of the Galvano electric motor M3 in a manner to make the amount of off-tracks zero. That is, the tracking control is carried out only by pivoting the Galvano mirror 56.

Also, the focus servo is such that, based on the output from the photo detector 58, the signal processing part 74 detects a focus signal, and based on the focus signal, the system controller 76 controls the drive circuit 82 of the voice coil motor M2 of the objective lens 42.

Figure 17:
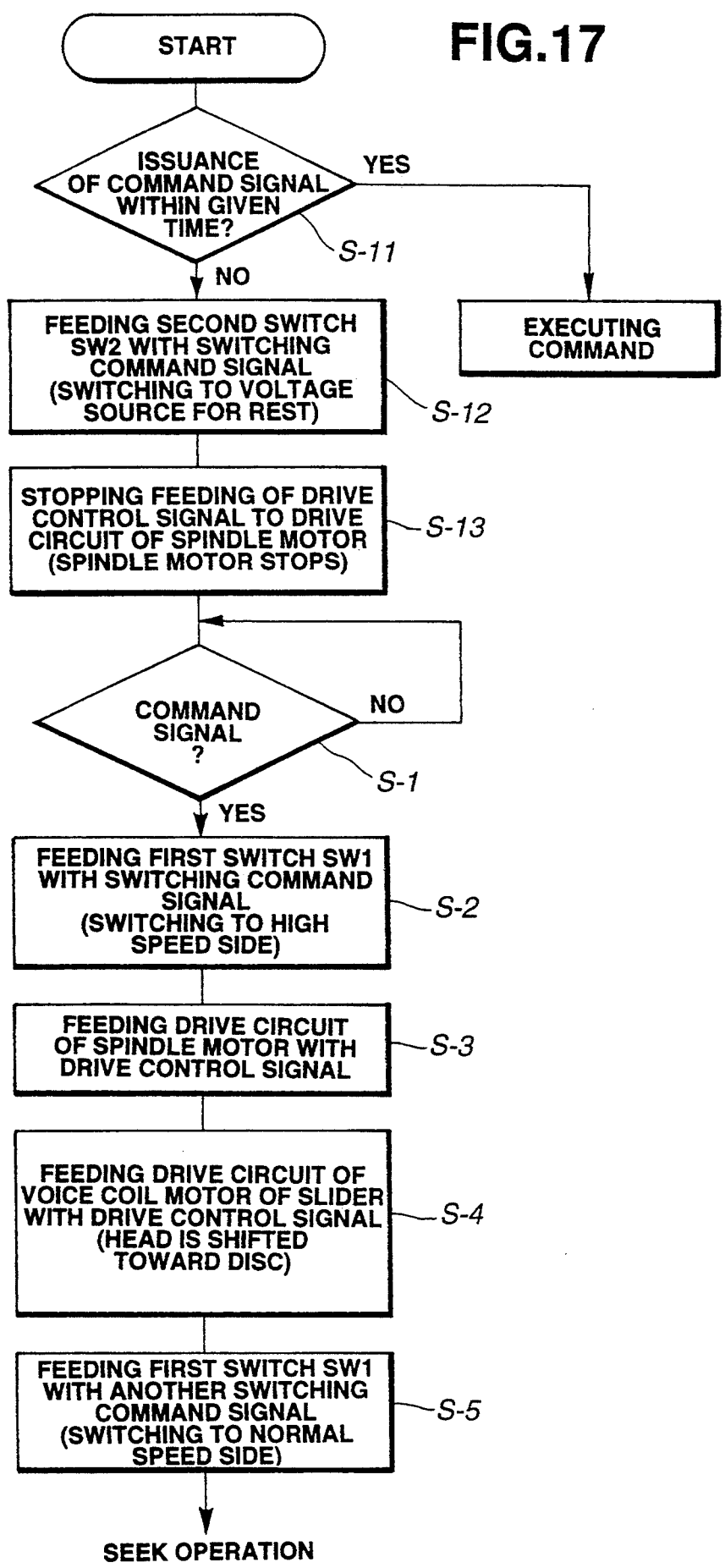
FIG. 17 is a flowchart showing programmed operation steps used when a command is not issued in a given time.

If a command signal is not issued from the host computer within a given time, the system controller 76 carries out the operation which is shown in the flowchart of FIG. 17.

That is, if not (S-11), the system controller 76 feeds the second switch SW2 with a switching command signal (S-12) With this, the second switch SW2 switches to connect with the voltage source 81 for rest, and thus, the voltage of this source 81 is applied to the drive circuit 80 of the voice coil motor M1 of the slider 33. Thus, the slider 33 is moved to the rest position. Thereafter, the system controller 76 stops feeding the drive control signal to the drive circuit 77 of the spindle motor 13 (S-13), and thus the disc D stops. This condition is maintained until a next command signal is received.

That is, until the time when the next command signal is received, the magnetic field modulating head H is held by the head resting structure 51, and thus the disc D is protected from contacting the head H. This is very advantageous because the polished UV plastic coating 28 of the disc D tends to attract nearby foreign particles. Furthermore, since the spindle motor 13 is deenergized, energy saving is achieved.

When, under this condition, a command signal (such as, writing command signal or the like) is issued from the host computer (S-1) the above-mentioned steps S-2, S-3, S-4 and S-5 are carried out for controlling the spindle motor 13 and the slider 33.

Figure 18:
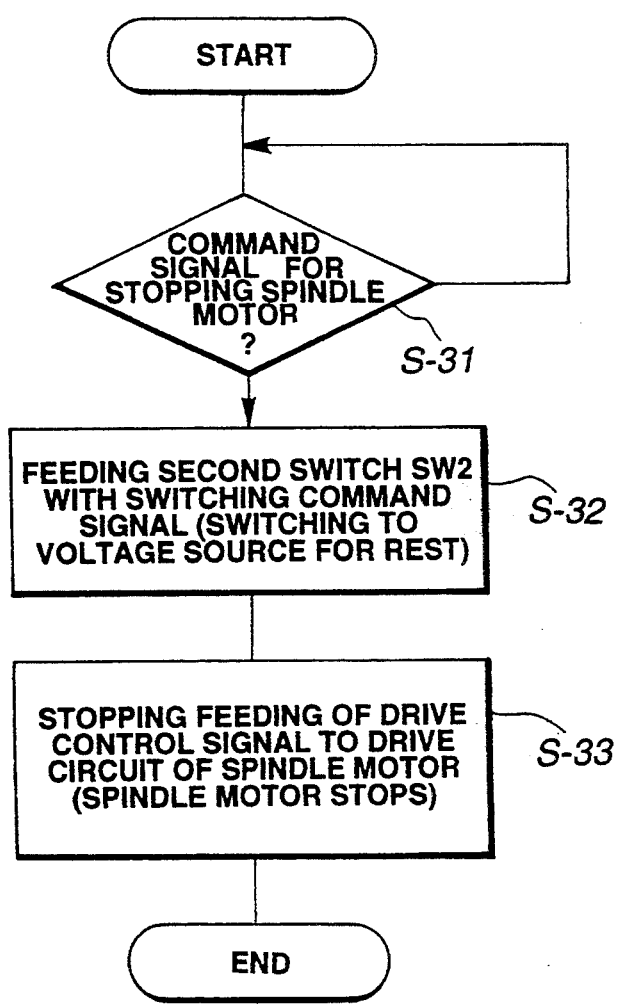
FIG. 18 is a flowchart showing programmed operation steps used for stopping the spindle motor.

If the host computer issues a command signal for stopping the spindle motor 13, the system controller 76 carries out the operation which is shown in the flowchart of FIG. 18.

That is, upon issuance of such signal from the host computer (S-31) the system controller 76 feeds the second switch SW2 with a switching command signal (S-32). With this, the second switch SW2 switches to connect with the voltage source 81 for rest, and thus, the voltage of the source 81 is applied to the drive circuit 80 of the voice coil motor M1 of the slider 33. Thus, the slider 33 is moved to the rest position. Thereafter, the system controller 76 stops feeding of the drive control signal to the drive circuit 77 of the spindle motor 13 (S-33) and thus the disc D stops.

As will be understood from the above, when the magnetic field modulation head H is not in use, the same can assume the stable rest position separating away from the disc D. Thus, under such rest condition, undesired contact between the disc D and the head H does not occur, even if they are vibrated.

What is claimed is:

1. A magneto-optical disc drive device comprising:
    a disc driving mechanism including a drive shaft powered by an electric motor;
    connecting means for detachably connecting a magneto-optical disc to said drive shaft, said connecting means including:
        a circular press plate for pressing on a central portion of one surface of the disc;
        a single bolt connecting said circular press plate to said drive shaft to sandwich the disc tightly therebetween;
        a first annular spacer to be interposed between said circular press plate and the disc;
        a second annular spacer to be interposed between said drive shaft and the disc.
        a diametrically smaller circular end portion defined by said drive shaft, said smaller circular end portion being fully received in the circular center opening of the disc;
        a diametrically larger circular end portion defined by said drive shaft thereby to provide the drive shaft with an annular step between said smaller and larger circular end portions, said annular step having said second annular spacer seated thereon; and
        means defining a threaded bolt opening in the center of said smaller circular end portion, said threaded bolt opening receiving said single bolt;
    a magnetic field modulation head positioned at one side of the disc when the disc is connected to said drive shaft;
    an optical unit positioned at the other side of the disc when the disc is connected to said drive shaft;
    a moving mechanism for moving both said magnetic field modulation head and said optical unit in a radial direction of the disc when the disc is connected to said drive shaft; and
    floating means for floating said head in air by using the force of an air flow which is produced when the disc, connected to the drive shaft, is rotated.

2. A magneto-optical disc drive device as claimed in claim 1, in which said floating means comprises a spring plate having one end which supports said head and another end which is connected to a slider of said moving mechanism.

3. A magneto-optical disc drive device comprising:
    a disc driving mechanism including a drive shaft powered by an electric motor;
    connecting means for detachably connecting a magneto-optical disc to said drive shaft, said connecting means including:
        a circular press plate for pressing on a central portion of one surface of the disc;

a single bolt connecting said circular press plate to said drive shaft for sandwiching the disc tightly therebetween;

a first annular spacer interposed between said circular press plate and the disc;

a second annular spacer interposed between said drive shaft and the disc;

a diametrically smaller circular end portion defined by said drive shaft, said smaller circular end portion being fully received in a circular center opening of the disc;

a diametrically larger circular end portion defined by said drive shaft thereby to provide the drive shaft with an annular step between said smaller circular end portion and the larger circular end portion, said annular step having said second annular spacer seated thereon; and means defining a threaded bolt opening in the center of said smaller circular end portion, said threaded bolt Opening receiving said single bolt;

a magnetic field modulation head positioned at one side of said disc when the disc is connected to said drive shaft;

an optical unit positioned at another side of said disc when the disc is connected to said drive shaft;

a moving mechanism for moving both said magnetic field modulation head and said optical unit in a radial direction of the disc when the disc is connected to said drive shaft; and floating means for floating said head in air by using the force of an air flow which is produced when the disc, connected to the drive shaft, is rotated, wherein said circular press plate is formed at its peripheral portion with an annular ridge which is pressed against said first annular spacer.

4. A magneto-optical disc drive device comprising:

a disc driving mechanism including a drive shaft powered by an electric motor;

connecting means for detachably connecting a magneto-optical disc to said drive shaft, said connecting means including:

a circular press plate for pressing on a central portion of one surface of the disc;

a single bolt connecting said circular press plate to the drive shaft for tightly sandwiching the disc therebetween;

a first annular spacer to be interposed between said circular press plate and the disc;

a second annular spacer to be interposed between said drive shaft and the disc;

a diametrically smaller circular end portion defined by said drive shaft, said smaller circular end portion being fully received in a circular center opening of the disc;

a diametrically larger circular end portion defined by said drive shaft thereby to provide the drive shaft with an annular step between said smaller circular end portion and the larger circular end portion, said annular step having said second annular spacer seated thereon; and means defining a threaded bolt opening in the center of said smaller circular end portion, said threaded bolt opening receiving said single bolt;

a magnetic field modulation head positioned at one side of the disc when the disc is connected to the drive shaft;

an optical unit positioned at the other side of the disc when the disc is connected to the drive shaft;

a moving mechanism for moving both said magnetic field modulation head and said optical unit in a radial direction of the connected disc; and floating means for floating said head in air by using the force of an air flow which is produced when the connected disc is rotated, wherein the circular center opening is concentric with a centering track stored in the disc.

5. A magneto-optical disc drive device as claimed in claim 2, further comprising a head resting structure which stationarily holds said head when said head comes to a rest position.

6. A magneto-optical disc drive device as claimed in claim 5, in which said head resting structure comprises an elongate member fixed to a stationary portion of said disc drive device, said elongate member having a flat major surface on which said spring plate rides when said head assumes a rest position and a tapered end surface through which said spring plate sets on said flat major surface.

7. A magneto-optical disc drive device as claimed in claim 1, in which said optical unit comprises:

a laser beam reflecting mirror;

an objective lens positioned above said mirror and just far enough from said magnetic field modulation head for the disc to fit therebetween, the numerical aperture of said lens being equal to or greater than 0.55; and a pair of voice coil motors for moving said lens.

* * * * *